United States Patent [19]

Perrault et al.

[11] 4,289,551
[45] Sep. 15, 1981

[54] HIGH-ENERGY EXPLOSIVE OR PROPELLANT COMPOSITION

[75] Inventors: Guy Perrault; Roger Lavertu, both of Ste-Foy; Jean-Francois Drolet, Loretteville, all of Canada

[73] Assignee: Her Majesty the Queen in right of Canada, as represented by the Minister of National Defence, Ottawa, Canada

[21] Appl. No.: 773

[22] Filed: Jan. 2, 1979

[30] Foreign Application Priority Data

Feb. 7, 1978 [CA] Canada ................................ 296408

[51] Int. Cl.³ ............................................. C06B 45/10
[52] U.S. Cl. ................................. 149/19.4; 149/19.9; 149/20
[58] Field of Search ................. 149/19.4, 19.9, 20

[56] References Cited

U.S. PATENT DOCUMENTS

| 3,801,385 | 4/1974 | Mastrolia et al. | 149/19.9 |
| 4,090,893 | 5/1978 | Cucksee et al. | 149/19.9 |
| 4,116,734 | 9/1978 | Perrault et al. | 149/19.9 |
| 4,158,583 | 6/1979 | Frosch | 149/19.9 |
| 4,214,928 | 7/1980 | Consaga | 149/19.6 |

Primary Examiner—Edward A. Miller
Attorney, Agent, or Firm—Cushman, Darby & Cushman

[57] ABSTRACT

Pour-castable composites are disclosed having mechanical properties such that they are useful either as a high-energy explosives or as propellants. The novel composites include (a) either RDX or HMX as a solid highly-energetic ingredient; (b) a hydroxy-terminated polybutadiene based binder; (c) a diisocyanate curing agent, and (d) a compound of the structural formula

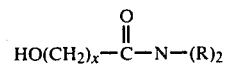

wherein R is $CH_3$, $CH_3(CH_2)_x$ or $C_xH_{(2x+1)}$, and where x is an integer from 1 to 6, alone or mixed with N,N-di-(2-hydroxyethyl)-4,4-dimethylhydantoin as chemically compatible surfactants.

24 Claims, No Drawings

HIGH-ENERGY EXPLOSIVE OR PROPELLANT COMPOSITION

This invention relates to a pour-castable composite for use as a high-energy explosive or propellant of improved mechanical properties.

In order for such a composite to be pour-castable, certain physical properties which facilitate processing must be within defined limits. Moreover, to produce sufficient energy, a highly-energetic ingredient must be included.

Applicant has previously found that both of these criteria may be satisfied by utilizing in composite explosives a highly-energetic ingredient e.g. RDX (Cyclotrimethylenetrinitramine) or HMX (Cyclotetramethylenetetranitramine) in conjunction with a surfactant. This is the subject of applicants' Ser. No. 840,367 filed Oct. 7, 1977, now U.S. Pat. No. 4,116,734. More specifically, in that application, a pour-castable explosive composition is described, comprising a solid highly-energetic ingredient e.g. RDX and HMX, a polybutadiene based binder, a curing agent for said binder e.g. a diisocyanate, and a surface active agent. A first class of surfactant which is a phospholipid e.g. lecithin, serves to improve the physical properties to facilitate processing. A second class of surfactant e.g. suitable organofunctional silanes which are chemically compatible with the energetic ingredient result in improvement of certain mechanical properties of the composite explosive.

It has now been found by applicant that certain mechanical properties may be improved further to enable the use of a highly-energetic ingredient e.g. RDX and HMX in composite propellants. Specifically, the elongation ($\epsilon_m$) must be 30% to 50% at room temperature and preferably of the order of 20% to 50% at $-50°$ C. Moreover, the strain ($\sigma_m$) must be in the range of 0.5 to 1.0 MPa.

It is well known that certain organic products form stable complexes with HMX. These are, in increasing order of stability, ketones, lactones, pyrrolidinone, N,N-substituted acetamides, and N,N-substituted formamides. It has therefore been hypothesized that, in a composite explosive or propellant, a product of this kind that includes a functional group similar to that of the prepolymer (OH in the case of a hydroxy-terminated polybutadiene e.g. Poly BD R45M and Poly BD R45HT, trademarks of Arco Chemicals Co.) might, on the one hand, form a complex at the surface of the solid RDX or HMX and, on the other hand, react with the curing agent of the polymer matrix to form a strong interface between the matrix and the binding agent.

Proceeding on this hypothesis, we looked for organic products whose structure would permit this dual action of complexing at the solid surface and interacting with the polymer matrix. Two groups of organic compounds were selected to verify the initial hypothesis.

The first group of structural formula (I) in which the substituted hydantoin group gave reason to believe that it might behave like the substituted amides, while the hydroxyl functions might react with the isocyanates of the curing agent to form urethane bonds identical to those of the hydroxy-terminated polybutadiene that was subjected to the curing process.

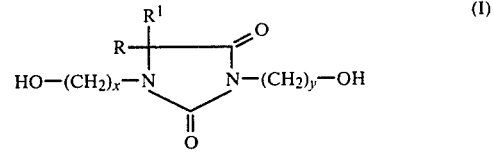

where R and/or $R^1$ is $CH_3$, $CH_3(CH_2)_x$ or $C_xH_{(2x+1)}$, and where x and y are integers from 1 to 6.

The preferred member of this group is N,N-di-(2-hydroxyethyl)-4,4-dimethylhydantoin also known as Dantocol DHE manufactured by Glyco Chemicals Inc.

The second group of compounds of structural formula (II)

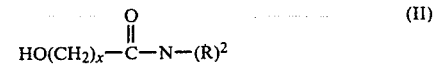

where $R^2$ is $CH_3$, $CH_3(CH_2)_x$ or $C_xH_{(2x+1)}$, and where x is an integer from 1 to 6, includes the substituted amide group, which should complex with the RDX or HMX, and the hydroxyl substituent, which will react with the curing agent (isocyanate) of the matrix. The preferred member of this group is 4-hydroxy-N,N-dimethylbutyramide which may be synthesized according to Hochaptel and Paquot in Chemical Abstracts Vol. 59 at col. 6347.

According to the invention a pour-castable composite for use as a high-energy explosive or propellant is contemplated, comprising a solid highly-energetic ingredient selected from RDX and HMX, a hydroxy-terminated polybutadiene based binder, a diisocyanate curing agent, and a chemically compatible surfactant selected from the group consisting of compounds of structural formula I, compounds of structural formula II, and mixtures thereof.

A plasticizer for the hydroxy-terminated polybutadiene based binder is preferably included e.g. di-(ethylhexyl)-azelate (DEHA) and dioctyl adipote (DOA) to facilitate processing.

Certain physical properties of the composite e.g. viscosity and gel time, which facilitate processing, particularly at low temperatures, are improved if a phospholipid emulsifier is included e.g. lecithin and asolectin (a tradename for a highly purified phospholipid product comprising lecithin, caphalin, inositol phosphatides and soybean oil, manufactured by American Lecithin Company).

Additionally, Al and $NH_4ClO_4$ as solid ingredients could be added to satisfy specific requirements. Al could be added for underwater applications (torpedoes) where a large volume of gas is required. $NH_4ClO_4$ could be employed to obtain stable burning of the propellant.

The preferred composite consists of:

| | | %/w |
|---|---|---|
| a. | RDX or HMX | 39-89 |
| b. | hydroxy-terminated polybutadiene based binder (poly BD ®R45M or R45HT) | 5-12 |
| c. | diisocyanate curing agent for binder (TDI, DDI, IPDI, HMI etc.) | 0.5-1.5 |
| d. | chemically compatible surfactant (Dantocol, HDBA, mixtures etc.) | 0.05-0.50 |
| e. | a plasticizer (DEHA, DOA etc.) | 0-8 |
| f. | phospholipid processing agent (lecithin, asolectin etc.) | 0-0.15 |

-continued

| | %/w |
|---|---|
| g. a catalyst (e.g. FeAA) | 0-0.5 |
| h. NH4ClO4 (as burning rate controller) | 0-50 |
| i. Al (as gas generator) | 0-30 |

Poly BD is a class of hydroxy-terminated polybutadiene prepolymers sold by Arco Chemicals Co. Poly BD R-45M has the formula:

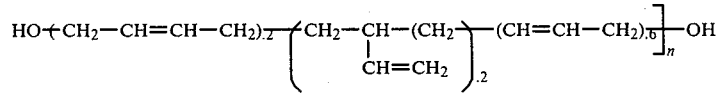

in which n equals 44–60 and the polybutadiene structure is 60% trans-1,4, 20% cis-1,4 and 20% vinyl-1,2 Poly BD R-45HT has the same formula as above but the valve of n is from 57 to 65.

The preferred method of making the composite involves feeding the ingredients into a conventional mixing apparatus according to the following sequence:

a. Poly BD®
b. Plasticizer
c. Surface agents (asolectin, Dantocol, HDBA etc.)
d. Fine energetic crystals (RDX, HMX, NH4ClO4 Al, etc.)
e. Coarse energetic crystals (RDX, HMX, NH4ClO4 etc.)
f. Vacuum ($10^{-3}$ mmHg) (2-3 hr)
g. Isocyanate
h. Vacuum (20-45m)
i. Casting in mould, and
j. Curing at 60° C.

If the composite is to be used as an explosive, initiation is effected by means of a conventional detonator; if it is to be used as a propellant, initiation is effected by means of a conventional igniter and consequently, the composite will burn instead of explode.

In addition, it is clear that certain production parameters, e.g. NCO/OH ratio of the polymer matrix, affect the mechanical properties.

This will be apparent from the following examples which serve to illustrate preferred embodiments of the invention.

EXAMPLE 1

In a Sigma-type mixing machine with a capacity of 0.5 gallons, mix 83% RDX (70% class C and 30% class E), 5.948% of a plasticizer (di-(ethylhexyl)-azelate (DEHA), 0.0017% of catalyst (iron acetylacetonate (FeAA)), 0.15% of an additive, asolectin, which reduces the viscosity of the mixture and improves the adsorption of the particles of solids by the bonding agent, 10.75% of a sufficient amount of curing agent (tolyl diisocyanate (TDI)) and of a hydroxy-terminated polybutadiene (HTPB) i.e. Poly BD® R45M or R45HT to yield an NCO/OH ratio of about 1.1, and 0.15% of the surfactant Dantocol DHE. The resulting mixture is vacuum cast in a suitable container, placed in an oven at 60° C. and heated until it reaches a uniform hardness of 65±1 Shore A units. This takes three to seven days. The pot life of this mixture is estimated to be 300±30 minutes.

Three different mixtures were prepared according to this formula, yielding the mechanical properties summarized in Table 1, where M is the Young modulus, $\epsilon_e$ is the elastic elongation as defined by the equation $$\epsilon_e = \frac{100 \times \sigma_m}{M}$$

and the product $\sigma_m \times \epsilon_e$ describes the mechanical rating of each mixture. The other parameters are as previously defined.

TABLE 1

Mechanical Properties of Composites with 0.15% of Dantocol DHE

| | Mechanical Properties at 293K. (20° C.) | | | | | Mechanical Properties at 223 K. (−50° C.) | | |
|---|---|---|---|---|---|---|---|---|
| Test | $\sigma_m$ MPa | $\epsilon_m$ % | M MPa | $\epsilon_e$ % | $\sigma \times \epsilon_e$ MPa | $\sigma_m$ MPa | $\epsilon_m$ % | $\epsilon_e$ |
| 1 | 0.87 | 36 | 5.8 | 15 | 13 | 1.9 | 18 | 4.8 |
| 2 | 0.84 | 45 | 6.0 | 14 | 12 | 1.9 | 16 | 5.7 |
| 3 | 0.83 | 32 | 6.1 | 13.5 | 11 | 1.9 | 16 | 6.3 |

It will be seen from the table that $\sigma_m$ and $\epsilon_m$ at room temperature are within the essential limits for utility as a propellant, although $\epsilon_m$ at −50° C. is slightly below the preferred lower limit of 20%.

EXAMPLE 2

The process described in Example 1 is repeated exactly, except that the 0.15% of Dantocol DHE is replaced by 0.15% of HDBA. This results in a uniform hardness of 28 Shore A after eight to nine days of heating. The pot life of this mixture is 300 minutes and its mechanical properties are as follows:

at 293° K. (20° C.)
$\sigma_m = 0.38$ MPa
$\epsilon_m = 53\%$
M = 1.1 MPa
$E_e = 34$
$\sigma_m \times \epsilon_e = 13$ MPa
at 223° K. (−50° C.)
$\sigma_m = 1.2$ MPa
$\epsilon_m = 25.5\%$
$\epsilon_e = 11$ These results indicate that HDBA appears to be better than Dantocol DHE as far as elongation ($\epsilon_m$) is concerned, but not as good in relation to $\sigma_m$. In fact the value for $\sigma_m$ at room temperature is slightly below the defined requirement.

EXAMPLE 3

The process described in Example 2 is repeated with the NCO/OH ratios of HTPB and curing agent being increased to 1.2 and 1.3, giving a pot life of 300 minutes and a heating time of nine and fifteen days, respectively, after which hardness reaches 47 and 49 Shore A. The mechanical properties of these two composites are summarized in Table 2, which also gives the properties of the composite of Example 2 to facilitate comparison.

TABLE 2

Effect of the Degree of Cross-linking on the Mechanical Properties of Composites with 0.15% of HDBA

| | | at 293° K. (20° C.) | | | | at 223° K. (−50° C.) | | |
|---|---|---|---|---|---|---|---|---|
| NCO/OH | $\sigma_m$ MPa | $\epsilon_m$ % | M MPa | $\epsilon_e$ — | $\sigma_m \times \epsilon_e$ MPa | $\sigma_m$ MPa | $\epsilon_m$ % | $\epsilon_e$ — |
| e.g. 2  1.1 | 0.38 | 53 | 1.1 | 34 | 13 | 1.2 | 25.5 | 11 |
| e.g. 3  1.2 | 0.52 | 35 | 2.8 | 19 | 9.9 | 1.6 | 11 | 7 |
| e.g. 3  1.3 | 0.58 | 34 | 2.8 | 20 | 11.8 | 1.6 | 17 | 9 |

Increasing NCO/OH ratio in cured binder results in improvement of $\sigma_m$, but has detrimental effect on $\epsilon_m$, particularly at −50° C. Preferable NCO/OH ratio appears to be about 1.1.

EXAMPLE 4

The process described in Example 2 is repeated with an NCO/OH ratio of 1.25, and the quantities of the catalyst and plasticizer are changed from 0.0017 to 0.0034 and 0.0051%; and from 5.9483 to 5.9466 and 5.9449, respectively. The pot life is then 300, 360 and 500 minutes, respectively, and the hardness, after approximately two weeks of heating, is 48, 44 and 43 Shore A. The properties of these products are summarized in Table 3.

TABLE 3

Effect of the Percentage of Catalyst on the Mechanical Properties of a Composite with 0.15% HDBA

| | Mechanical Properties | | | | | | | |
|---|---|---|---|---|---|---|---|---|
| | at 293K. (20° C.) | | | | | at 223K. (−50° C.) | | |
| % of Catalyst | $\sigma_m$ MPa | $\epsilon_m$ % | M MPa | $\epsilon_e$ % | $\sigma_m \times \epsilon_e$ MPa | $\sigma_m$ MPa | $\epsilon_m$ % | $\epsilon_e$ % |
| .0017 | 0.55 | 35 | 2.8 | 20 | 11 | 1.6 | 14 | 8 |
| .0034 | 0.52 | 41 | 2.3 | 23 | 12 | 1.7 | 14 | 8 |
| .0051 | 0.49 | 40 | 2.1 | 23 | 11 | 1.5 | 14 | 7 |

The increase in amount of catalyst is therefore seen to have little effect, if any on the mechanical properties studied.

EXAMPLE 5

The process described in Example 1 is repeated, except that the percentage of Dantocol DHE is set at 0.05% in an initial test and at 0.25% in a second test the percentages of DEHA are respectively, 6.0483 and 5.8483. The pot life is then 220 and 372 minutes, respectively, and the hardness after a week of heating is 57 and 51 Shore A, respectively. Table 4 summarizes the mechanical properties of these two products compared to the products of Example 1 (0.15% DHE).

TABLE 4

Effect of Percentage of Dantocol DHE on the Mechanical Properties of Composites

| | Mechanical Properties | | | | | | | |
|---|---|---|---|---|---|---|---|---|
| | 293K. (20° C.) | | | | | 223K. (−50° C.) | | |
| % of Dantocol DHE | $\sigma_m$ MPa | $\epsilon_m$ % | M MPa | $\epsilon_e$ % | $\epsilon_e \times \sigma_m$ MPa | $\sigma_m$ MPa | $\epsilon_m$ % | $\epsilon_e$ % |
| 0.05 | 0.63 | 20 | 4.9 | 13 | 8.2 | 1.6 | 13 | 7.4 |
| 0.15 | 0.87 | 36 | 5.8 | 15 | 13 | 1.9 | 18 | 4.8 |
| 0.25* | 0.74 | 50 | 2.9 | 26 | 19 | 1.8 | 30 | 8.9 |

It will be seen that 0.15% Dantocol DHE appears to give best $\sigma_m$ at both temperatures, while 0.25% gives better $\epsilon_m$ at both temperatures and finally an acceptable $\epsilon_m$ at −50° C. It therefore appears that the preferred lower limit of Dantocol is 0.25%.

EXAMPLE 6

The process described in Example 1 is repeated, but the ratio of cross-linking (NCO/OH) is reduced to 1.0 to 0.9. Pot life was found to be 250 and 415 minutes. Hardness was 51 after three days of heating in the first case, and 19 after nine days of heating in the second. The properties of these two composites are summarized in Table 5, again along with those of Example 1 to facilitate comparison.

TABLE 5

Effect of a Reduction in the Percentage of Cross-Linking on a Composite Containing 0.15% Dantocol DHE.

| | Mechanical Properties | | | | | | | |
|---|---|---|---|---|---|---|---|---|
| % of Cross-Linking | at 293K (20° C.) | | | | | at 223K. (−50° C.) | | |
| NCO/OH | $\sigma_m$ MPa | $\epsilon_m$ % | M MPa | $\epsilon_e$ % | $\sigma_m \times \epsilon_e$ MPa | $\sigma_m$ MPa | $\epsilon_m$ % | $\epsilon_e$ % |
| 1.1 | 0.87 | 36 | 5.8 | 15 | 13 | 1.9 | 18 | 4.8 |
| 1.0 | 0.78 | 57 | 2.8 | 27 | 21 | 1.9 | 25 | 7.8 |
| 0.9 | 0.30 | 76 | 0.8 | 40 | 12 | 0.4 | 22 | 7.5 |

It is seen that NCO/OH ratio of 0.9 gives $\sigma_m$ too low, while 1.0 gives best $\epsilon_m$ at −−50°. Therefore, optimum NCO/OH ratio appears to be about 1.0 when using Dantocol.

EXAMPLE 6 (sic)

The process described in Example 1 is repeated, except that the curing agent, TDI, is replaced by isophorone diisocyanate (IPDI). The following results were then obtained:

Pot life: >720 minutes
Heating time: 20 days
Hardness: 45 Shore A
Properties at 293° K. (20° C.):
$\sigma_m = 0.48$ MPa
$\epsilon_m = 44\%$
M = 2.3 MPa
$\epsilon_e = 21$
$\sigma_m \times \epsilon_e = 10$ MPa
Properties at 223° K. (−50° C.):
$\sigma_m = 1.4$ MPa
$\epsilon_m = 18\%$
$\epsilon_e = 8.7$ TDI is thus seen to be a better curing agent for the purposes of this invention. An increase in the percentage of catalyst or the use of tin dibutyldilaurate instead of FeAA makes it possible to shorten the heating time slightly.

EXAMPLE 7

The process described in Example 1 is repeated, except that the 0.15% of Dantocol DHE is replaced by concentration ratios by percentage of Dantocol DHE and HDBA of 0.11/0.04, 0.07/0.08 and 0.04/0.11. Pot life is then approximately 300 minutes, and hardness after a week of heating is 57, 48 and 41 Shore A. The mechanical properties of these three composites are summarized in Table 6.

TABLE 6
Effect of the Simultaneous Use of Dantocol and HDBA on Mechanical Properties

| | | Mechanical Properties | | | | | | | |
|---|---|---|---|---|---|---|---|---|---|
| | | at 293K. (20° C.) | | | | | at 223K. (−50° C.) | | |
| % Dantocol | % HDBA | $\sigma_m$ MPa | $\epsilon_m$ % | M MPa | $\epsilon_e$ | $\epsilon_e \times \sigma_m$ MPa | $\sigma_m$ MPa | $\epsilon_m$ % | $\epsilon_e$ |
| 0.11 | 0.04 | 0.80 | 42 | 4.5 | 18 | 14 | 2.0 | 16 | 5.1 |
| 0.07 | 0.08 | 0.67 | 52 | 2.2 | 31 | 21 | 1.7 | 20 | 10 |
| 0.04 | 0.11 | 0.52 | 57 | 1.6 | 42 | 17 | 1.6 | 17 | 8.1 |

The preferred composition is 0.07 Dantocol and 0.08 HDBA in view of the best value for $\epsilon_m$ at −50° C.

EXAMPLE 8

In a Sigma-type mixing machine with a capacity of 0.5 gallons, mix 85% HMX, 5.25% DEHA, 0.15% asolectin, 9.45% of a mixture of a HTPB i.e. Poly BD® R45M or R45HT and TDI to yield an NCO/OH ratio of 1.1, and 0.15% HDBA in the initial sample; this is replaced by 0.15% of Dantocol in the second. Pot life is then 180 and 130 minutes respectively, and hardness 21 Shore A after four days of heating and 60 Shore A after three days, respectively. The mechanical properties of these products are given in Table 7.

TABLE 7
Effect of Surfactant on a Composite based on HMX

| | Mechanical Properties | | | | | | | |
|---|---|---|---|---|---|---|---|---|
| | at 293K (20° C.) | | | | | at 223K. (−50° C.) | | |
| Surfactant 0.15% | $\sigma_m$ MPa | $\epsilon_m$ % | M MPa | $\epsilon_e$ | $\sigma_m \times \epsilon_e$ MPa | $\sigma_m$ MPa | $\epsilon_m$ % | $\epsilon_e$ |
| HDBA | 0.26 | 45 | 0.94 | 28 | 7.5 | 0.51 | 34 | 13 |
| Dantocol DHE | 0.25 | 28 | 4.4 | 20 | 17 | 1.66 | 27 | 12 |

As was apparent in example 2, HDBA appears to be preferable to Dantocol DHE as far as elongation ($\epsilon_m$) is concerned.

EXAMPLE 9

The process described in Example 8 is repeated, except that the percentage of Dantocol DHE is reduced to 0.07% of the total mixture and the percentage of DEHA is increased to 5.33%. Results are then as follows:

Pot life: 160 minutes
Heating time: 2.5 days
Hardness: 61 Shore A
Mechanical properties at 293° K. (20° C.):
$\tau_m = 0.69$ MPa
$\epsilon_m = 21\%$
M = 5.4 MPa
$\epsilon_e = 13$
$\sigma_m \times \epsilon_e = 9.0$ Mechanical properties at 223° K. (−50° C.):
$\sigma_m = 1.4$ MPa
$\epsilon_m = 14\%$ It thus appears that it would be a disadvantage to decrease the amount of Dantocol.

EXAMPLE 10

The process described in Example 9 is repeated, except that 0.03% of HDBA is added in an initial sample and 0.08% in a second the percentages of DEHA being respectively, 5.37% and 5.32%. Pot life was then found to be 375 minutes and 245 minutes, and hardness after three days of heating was 51 and 27 Shore A. The mechanical properties are summarized in Table 8.

TABLE 8
Effect of Dantocol/HDBA Mixtures on the Mechanical Properties of HMX Composites

| | | Mechanical Properties | | | | | | | |
|---|---|---|---|---|---|---|---|---|---|
| | | at 293K. (20° C.) | | | | | at 223K, (−50° C.) | | |
| Dantocol % | HDBA % | $\sigma_m$ MPa | $\epsilon_m$ % | M MPa | $\epsilon_e$ | $\sigma_m \times \epsilon_e$ MPa | $\sigma_m$ MPa | $\epsilon_m$ % | $\epsilon_e$ |
| 0.07 | 0.03 | 0.60 | 35 | 2.6 | 45 | 14 | 1.5 | 24 | 9.1 |
| 0.07 | 0.08 | 0.38 | 55 | 1.0 | 37 | 14 | 1.3 | 20 | 12 |

As with RDX in example 7, the 0.07 Dantocol and 0.08 HDBA appears to be the preferable mix.

EXAMPLE 11

The process described in Example 7 is repeated, except that the R-45M polybutadiene is replaced by R-45HT and the plasticizer DEHA is replaced by dioctyl adipate (DOA). No catalyst is used and the NCO/OH ratio is decreased to 1.05. Pot life is then 445 minutes and the hardness after four days of heating is 56 Shore A. Dantocol and HDBA with a concentration of 0.07% and 0.08 respectively were used in both formulations. The mechanical properties are shown in Table 9 for R-45M, DEHA combination and R-45HT, DOA.

TABLE 9
Effect of R-45HT and DOA on the Mechanical Properties

| | at 293° K. | | | | | at 223° K. | | |
|---|---|---|---|---|---|---|---|---|
| | $\sigma_m$ MPa | $\epsilon_m$ % | M MPa | $\epsilon_e$ | $\sigma_m \times \epsilon_e$ MPa | $\sigma_m$ MPa | $\epsilon_m$ % | $\epsilon_e$ |
| R45M - DEHA | .68 | 52 | 2.2 | 31 | 30 | 1.7 | 13 | 6 |
| R45HT - DOA | .69 | 31 | 3.9 | 18 | 18 | 1.6 | 36 | 11 |

In view of the various embodiments described herein, it should be apparent to those skilled in the art that the present invention may be embodied in forms other than those specifically described without departing from the spirit or central characteristics of the invention. Thus, the specific embodiments described above, must be considered in all respects as illustrative and by no means restrictive.

We claim:

1. A pour-castable composite for use as a high-energy explosive or propellant consisting essentially of:
   a. a solid highly-energetic ingredient selected from cyclotrimethylenetrinitramine and cyclotetramethylenetetranitramine,
   b. a hydroxy-terminated polybutadiene based binder,
   c. a diisocyanate curing agent, and
   d. a chemically compatible surfactant selected from the group consisting of:

(1) compounds of the formula:

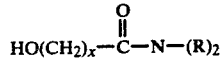

where R is $C_xH_{(2x+1)}$, and where each x is independently an integer from 1 to 6;
   and mixtures of (1) and N,N-di-(2-hydroxyethyl)-4,4-dimethylhydantoin.

2. A composite according to claim 3, including
   e. a plasticizer for the hydroxy-terminated polybutadiene based binder.

3. A composite according to claim 2, including
   f. a phospholipid processing agent.

4. A composite according to claim 1, wherein the elongation, ($\epsilon_m$) is 30% to 50% at room temperature and the strain ($\sigma_m$) is 0.5 to 1.0 MPa.

5. A composite according to claim 4, wherein the elongation ($\epsilon_m$) at $-50°$ C. is 20% to 50%.

6. A composite according to claim 5, wherein b. is selected from the group consisting of a compound of the formula:

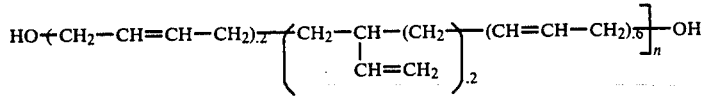

wherein n has a value of from 44 to 60 and a compound of the formula:

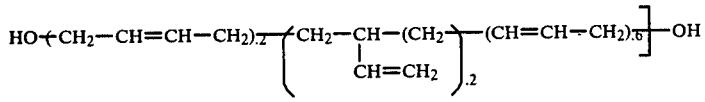

wherein n has a value of 57–65, provided that in both formulae the polybutadiene structure is 60% trans-1,4, 20% cis-1,4 and 20% vinly-1,2.

7. A composite according to claim 1, 3 or 6, wherein d. is 4-hydroxy-N,N-dimethylbutyramide.

8. A composite according to claim 1, 3 or 6, wherein d. is a mixture of N,N-di-(2-hydroxyethyl)-4,4-dimethylhydantoin and 4-hydroxy-N,N-dimethylbutyramide.

9. A pour-castable composite for use as a high-energy explosive or propellant, comprising:

| | | %/w |
|---|---|---|
| a. | a solid highly-energetic ingredient selected from the group consisting of cyclotrimethylenetrinitramrine and cyclotetramethylenetetranitramine [RDX and HMX], | 39–89 |
| b. | a hydroxy-terminated polybutadiene based binder selected from the group consisting of a compound of the formula: | |

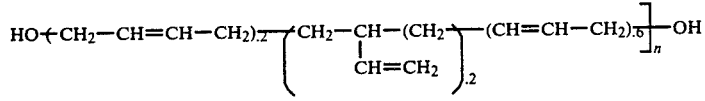

wherein n has a value of from 44 to 60, and a compound of the formula:

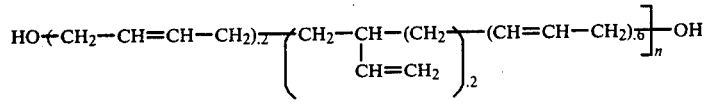

wherein n has a value of 57–65, provided that in both formulae the polybutadiene structure is 60% trans-1,4, 20% cis-1,4 and 20% vinly-1,2 [Poly BD® R45M and Poly BD® R45HT],

| | | |
|---|---|---|
| | | 5–12 |
| c. | a diisocyanate curing agent, | 0.5–1.5 |
| d. | a chemically compatible surfactant selected from the group consisting of 4-hydroxy-N,N-dimethylbutyramide and a mixture of N,N-di-(2-hydroxyethyl)-4,4-dimethylhydantoin, and 4-hydroxy-N, | |

-continued

|   |   | %/w |
|---|---|---|
|   | N-dimethylbutyramde, | 0.05–0.50 |
| e. | a plasticizer for (b.), | 0–8 |
| f. | a phospholipid processing agent selected from lecithin and asolectin | 0–0.15 |
| g. | a catalyst | 0–0.05 |
| h. | $NH_4ClO_4$ | 0–50 |
| i. | Al | 0–30 |

10. A composite according to claim 9, wherein a. is cyclotetramethylenetetranitranine.

11. A composite according to claim 10, wherein b. and c., the NCO/OH ratio is about 1.0.

12. A composite according to claim 10, wherein d. is 4-hydroxy-N,N-dimethylbutyramide.

13. A composite according to claim 12, wherein 4-hydroxy-N,N-dimethylbutyramide is present in an amount of about 0.15%/w.

14. A composite according to claim 13, wherein b. and c., the NCO/OH ratio is about 1.1.

15. A composite according to claim 10, wherein d. is a mixture of N,N-di-(2-hydroxyethyl)-4,4-dimethylhydantoin and 4-hydroxy-N,N-dimethylbutyramide.

16. A composite according to claim 15, wherein the mixture is present in an amount of about 0.15%/w.

17. A composite according to claim 16, wherein the mixture comprises 0.07%/w of N,N-di-(2-hydroxyethyl)-4,4-dimethylhydantoin and 0.08%/w of 4-hydroxy-N,N-dimethylbutyramide.

18. A composite according to claim 9, wherein a. is cyclotetramethylenetetranitramine.

19. A composite according to claim 18, wherein d. is 4-hydroxy-N,N-dimethylbutyramide.

20. A composite according to claim 19, wherein 4-hydroxy-N,N-dimethylbutyramide is present in an amount of about 0.15%/w, and wherein b. and c., the NCO/OH ratio is about 1.1.

21. A composite according to claim 18, wherein d. is a mixture of 4-hydroxy-N,N-dimethylbutyramide and N,N-di-(2-hydroxyethyl)-4,4-dimethylhydantoin present in an amount of about 0.15%/w.

22. A composite according to claim 21, wherein the mixture comprises 0.07%/w of N,N-di-(2-hydroxyethyl)-4,4-dimethylhydantoin and 0.08%/w of 4-hydroxy-N,N-dimethylbutyramide.

23. A pour-castable composite for use as a high energy explosive or propellant consisting, in percent by weight of:

|   |   | [%/w] |
|---|---|---|
| a. | Cyclotetramethylenetetranitramine [HMX] | 85% |
| b. and c. | hydroxy-terminated polybutadiene based binder selected from the group consisting of a compound of the formula: $$HO+CH_2-CH=CH-CH_2)_{\overline{z}}\left[CH_2-CH-(CH_2\underset{\underset{CH=CH_2}{\mid}}{\phantom{-}})-(CH=CH-CH_2)_{\overline{6}}\right]_{.2}OH$$ wherein n has a value of from 44 to 60 and a compound of the formula: $$HO+CH_2-CH=CH-CH_2)_{\overline{z}}\left[CH_2-CH-(CH_2\underset{\underset{CH=CH_2}{\mid}}{\phantom{-}})-(CH=CH-CH_2)_{\overline{6}}\right]_{.2}OH$$ wherein n has a value of 57–65, provided that in both formulae the polybutadiene structure is 60% trans -1,4, 20% cis-1,4 and 20% vinyl -1,2 [Poly BD ® R45M and Poly BD ® R45HT], and tolyl diisocyanate curing agent, wherein the NCO/OH ratio is about 1.1 | 9.45% |
| d. | 4-hydroxy-N, N-dimethylbutyramide | 0.15% |
| e. | di-(ethylhexyl)-azelate | 5.25% |
| f. | asolectin | 0.15% |
|   | Total | 100.00% |

24. A pour-castable for use as a high energy explosive or propellant consisting, in percent by weight, of:

|   |   | [%/w] |
|---|---|---|
| a. | Cyclotetramethylenetetranitramine [HMX] | 85% |
| b. and c. | hydroxy-terminated polybutadiene based binder selected from the group consisting of a |   |

-continued

| | | [%/w] |
|---|---|---|
| | compound of the formula: 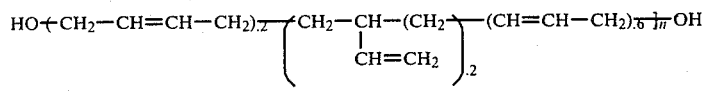 wherein n has a value of from 44 to 60 and a compound of the formula: 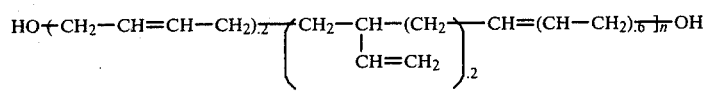 wherein n has a value of 57–65, provided that in both formulae the polybutadiene structure is 60% trans -1,4, 20% cis-1,4 and 20% vinly -1,2 [Poly BD ® R45M and diisocyanate curing agent, wherein the NCO/OH ratio is about 1.1 | 9.45% |
| d. | 4-hydroxy-N, N-dimethylbutyramide | 0.08% |
| d¹. | N, N,-di-(2-hydroxyethyl)-4, 4-dimethylhydantoin | 0.07% |
| e. | di-(ehtylhexyl)-azelate | 5.25% |
| f. | asolectin | 0.15% |
| | Total | 100.00% |

* * * * *